(12) United States Patent
Dhanwada et al.

(10) Patent No.: US 8,898,049 B2
(45) Date of Patent: Nov. 25, 2014

(54) SYSTEM LEVEL POWER PROFILING OF EMBEDDED APPLICATIONS EXECUTING ON VIRTUAL MULTICORE SYSTEM-ON-CHIP PLATFORMS

(75) Inventors: Nagashyamala R. Dhanwada, Fishkill, NY (US); Joseph Arun, Bangalore (IN); William W. Dungan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1265 days.

(21) Appl. No.: 12/426,440

(22) Filed: Apr. 20, 2009

(65) Prior Publication Data

US 2010/0268523 A1    Oct. 21, 2010

(51) Int. Cl.
| | | |
|---|---|---|
| *G06F 17/50* | (2006.01) | |
| *G06G 7/62* | (2006.01) | |
| *G06F 11/34* | (2006.01) | |
| *G06F 11/30* | (2006.01) | |
| *G06F 11/32* | (2006.01) | |

(52) U.S. Cl.
CPC ........ *G06F 11/3457* (2013.01); *G06F 11/3447* (2013.01); *G06F 11/3062* (2013.01); *G06F 11/3013* (2013.01); *G06F 11/323* (2013.01); *G06F 11/302* (2013.01)
USPC .......................................... 703/13

(58) Field of Classification Search
USPC .................................... 703/14; 716/106
See application file for complete search history.

(56) References Cited

U.S. PATENT DOCUMENTS

| | | | |
|---|---|---|---|
| 7,149,636 B2 | 12/2006 | Cyran et al. | |
| 7,290,246 B2 | 10/2007 | Cyran et al. | |
| 2003/0191986 A1* | 10/2003 | Cyran et al. | 714/32 |
| 2004/0268159 A1 | 12/2004 | Aasheim et al. | |
| 2005/0102572 A1* | 5/2005 | Oberlaender | 714/29 |
| 2005/0131669 A1* | 6/2005 | Mielenz | 703/22 |
| 2005/0149897 A1* | 7/2005 | Yamashita et al. | 716/18 |

OTHER PUBLICATIONS

Chin et al., SoC Test Scheduling with Power-Time Tradeoff and Hot Spot Avoidance, 2004, IEEE, pp. 1-2.*
Edu Metz et al.; "Efficient Instrumentation for Performance Profiling;" Nokia Research Center; May 9, 2003.
Edu Metz et al.; "Performance Data Collection: Hybrid Approach;" ACM SIGSOFT Software Engineering Notes vol. 30, Issue 5 (Sep. 2005), pp. 126-135.

* cited by examiner

*Primary Examiner* — Omar Fernandez Rivas
*Assistant Examiner* — Bernard E Cothran
(74) *Attorney, Agent, or Firm* — Cantor Colburn LLP; H. Daniel Schnurmann (57) ABSTRACT

A method of generating system level power information for an embedded application configured to execute on a multi-core system-on-chip (SoC), which includes configuring a simulation model of hardware of the SoC that executes the embedded application; loading one or more software components of the embedded application into the simulation model of the SoC hardware; executing the one or more software components of the embedded application on the simulation model, and extracting state information about both the software components of the embedded application and hardware components of the SoC; determining, from the hardware state information, per-cycle energy values for the hardware components of the SoC; and creating a power profile from the software state information by accumulating the per-cycle energy values and assigning the per-cycle energy values to corresponding software components.

24 Claims, 8 Drawing Sheets

| Object | Attribute | Value |
|---|---|---|
| cpu0 | average_power | 1661.43 |
| cpu0 | duration | 1.1937e+07 |
| cpu0 | total_energy | 1.98324e+10 |
| cpu1 | average_power | 1683.84 |
| cpu1 | duration | 2.64602e+06 |
| cpu1 | total_energy | 4.45548e+09 |

Duration (usec): -1.0    Step size (usec): 10

| Object | Attribute |
|---|---|
| CONSOLE_0 | average_power |
| cpu0 | duration |
| cpu1 | duration_info_string |
| cpu_clock_0 | dynamic_power |
| dcr_bus | function_profile_str... |
| dcr_clock | idle_time |
| INTRPT_0 | instruction_count |
| memory | iss_parameter_string |
| opb_bus | power_estimation_... |
| opb_clock | power_info_string |
| plb_bus | static_power |
| plb_clock | total_energy |
| plb_opb | |
| UART_0 | |

SYSTEM LEVEL POWER PROFILING OF EMBEDDED APPLICATIONS EXECUTING ON VIRTUAL MULTICORE SYSTEM-ON-CHIP PLATFORMS

BACKGROUND

The present invention relates generally to power profiling in electronic devices and, more particularly, to system level power profiling of embedded applications executing on virtual multi-core system-on-chip (SoC) platforms.

With the proliferation of portable electronic and computing devices in modern society, power consumption has become a major constraint in the design of embedded applications. Of key concern to hardware and software engineers designing such applications is the accurate and efficient gathering of performance and power statistics early on in the design cycle, but with minimal performance overhead and without compromising on accuracy. Existing approaches to gathering such information may generally be classified into two major categories (hardware based and instrumentation based), both of which have their own set of drawbacks.

Hardware based profiling can be very expensive, although it has advantages, such as high frequency profiling and the ability to collect data with little or no impact on normal execution of the target system. However, with hardware based profiling, data may only be obtained from observable points in the system, and thus there is no access to other points of the system. On the other hand, instrumentation based profiling brings in additional overhead on the system. The overhead and effect of measurements on the system being measured must be controlled very carefully, which is often a very difficult task. Without careful control of overhead the power statistics may become skewed as the process of measurement directly alters the system's behavior. Moreover, the additional code added in the embedded application can introduce some spurious transactions, which in turn will affect the accuracy of system level power statistics.

SUMMARY

An exemplary method of generating system level power information for an embedded application configured to execute on a multi-core system-on-chip (SoC), includes configuring a simulation model of hardware of the SoC that executes the embedded application; loading one or more software components of the embedded application into the simulation model of the SoC hardware; executing the one or more software components of the embedded application on the simulation model, and extracting state information about both the software components of the embedded application and hardware components of the SoC; determining, from the hardware state information, per-cycle energy values for the hardware components of the SoC; and creating a power profile from the software state information by accumulating the per-cycle energy values and assigning the per-cycle energy values to corresponding software components.

In another embodiment, a computer program product includes a computer-readable storage medium containing computer program code that, when executed by a computer, implements a method of generating system level power information for an embedded application configured to execute on a multi-core system-on-chip (SoC). The method includes loading one or more software components of the embedded application into a simulation model of the SoC hardware; executing the one or more software components of the embedded application on the simulation model, and extracting state information about both the software components of the embedded application and hardware components of the SoC; determining, from the hardware state information, per-cycle energy values for the hardware components of the SoC; and creating a power profile from the software state information by accumulating the per-cycle energy values and assigning the per-cycle energy values to corresponding software components.

In still another embodiment, a system for generating system level power information for an embedded application configured to execute on a multi-core system-on-chip (SoC) includes a computing network including a processing device in communication with one or more computer memory storage devices. The computing network is further configured to implement a method, including loading one or more software components of the embedded application into a simulation model of the SoC hardware; executing the one or more software components of the embedded application on the simulation model, and extracting state information about both the software components of the embedded application and hardware components of the SoC; determining, from the hardware state information, per-cycle energy values for the hardware components of the SoC; and creating a power profile from the software state information by accumulating the per-cycle energy values and assigning the per-cycle energy values to corresponding software components.

BRIEF DESCRIPTION OF THE DRAWINGS

Referring to the exemplary drawings wherein like elements are numbered alike in the several Figures.

DETAILED DESCRIPTION

Table 1 below is a Glossary of terms that may be considered to facilitate a better understanding of one or more terms used in conjunction with a description of the invention embodiments hereinafter.

TABLE 1

"Abstraction" - Describes an object, using a model, in which some of the low-level details are ignored.
"Compiler" - A computer program that translates source code into object code.
"Cross Compiler" - A compiler which runs on one computer platform that is capable of generating object code for another target computer platform. Cross compilers are typically used for embedded-system software development, where the target computer platform is not well suited for hosting a native compiler.
"Cycle/Clock-Cycle" - Every computer contains an internal clock that synchronizes various computer components and regulates the rate at which instructions are executed. The CPU requires a fixed number of clock cycles to execute each instruction. The clock cycle is the time between two adjacent pulses of this internal clock. The faster the clock, the more instructions the CPU can execute per second.
"Disassembler" - A computer program which attempts to reverse the work of the linker and compiler to produce output text for a given executable. The output text can contain information about the machine code, functions, and source code which went into the creation of the executable.
"Executable" - A file containing machine code which can be loaded into a computer's memory and launched to perform its designed purpose.
"Function" - A software building block characterized by its input data, its manipulations of the input data, and its output data. Input data is often passed to a function via parameters and output data is often returned from a function via a return value. A function can be identified by its name.
"Hardware Architectural Exploration" - The action of searching for a hardware configuration that optimizes a specific metric (e.g., performance, power, etc.) by generating different variants of a base hardware architecture by the modification of parameters (e.g., bus width, cache size, etc.) of the architecture.
"Hardware Sub-Components" - Processors, buses, memories, and peripherals that make up the hardware parts of the system.
"Library" - A collection of object code files which are packaged together into a single file.
"Linker" - A computer program which combines object code and libraries into an executable.
"Multi-Core/Multi-Processor Designs" - An integrated circuit (IC) to which two or more processors have been attached.
"Object Code" - Typically, a binary (non-text) file translation of source code which uses a low-level representation (such as machine code) for expressing the behavior of one or more functions.
"Parameterized Model" - A model that is sensitive to changes in a given set of input parameters.
"Performance" - A generic term used in describing a measured characteristic of a system with an expected or measured result in order to give an indication of the quality of that characteristic.
"Power Model" - A model which captures the power consumption characteristics of a system component.
"Power Profile" - A representation of a system's power consumption via power waveforms which change over time.
"Simulation Model" - A representation of certain functional or behavioral aspects of a system which can be used in a simulation. Models of this sort will typically sacrifice accuracy, by applying the principles of abstraction, in order to gain faster simulation speeds.
"Software" - A generic term for a computer program which executes on a computer platform.
"Software Instrumentation" - Function calls or source code which are added into a piece of software for the purpose of collecting data or measuring metrics about the software (such as run-time or memory usage). Instrumentation function calls and source code are not needed for a piece of software to behave correctly.
"Source Code" - A text file expressing the behavior of one or more functions using a computer language notation such as C++.
"State Data" - Measured values at different internal points of a system which define its state. The value of the instruction address register, within a microprocessor, is one example of state data that defines the state of the microprocessor in terms of the current instruction being executed.
System - In this context, a system is the end result of integrating a given set of hardware and software components.
"System-on-Chip (SoC)" - A single chip that forms a self-contained system that generally includes at least one microcontroller, microprocessor, and/or digital signal processor core; at least one memory; at least one input/output (I/O) device; and software for controlling the system (including any I/O devices).
"Temporal" - Changing in time.
"Transaction" - An abstract model where both data and control information are conveyed together.
"Virtual Platform" - An abstract model of a system or system sub-component used to provide system functionality early in the design process. For example, a software engineer can use such a model to run his or her software before the actual hardware is implemented. This type of model may be used as an executable specification to drive hardware development, as well as, enable early system integration and validation of the software and hardware running together.

Disclosed herein is a method and system for implementing efficient and accurate gathering of system level power and performance statistics about an embedded application executing on a multi-core system-on-chip (SoC). The efficiency and accuracy of the statistics gathering technique is realized through the intelligent application of hardware profiling techniques on a virtual platform.

As indicated above, existing approaches make use of hardware based profiling techniques or other instrumentation based profiling techniques which bring in spurious bus transactions which affect the accuracy and reliability of the system level power statistics gathered. However, by implementing a hardware monitoring-based profiling approach within a virtual system (so that address trace information about the embedded application may be collected), during the execution of the application on the virtual platform, profile data is gathered and also back-annotated to the symbolic high level function name. In so doing, additional feedback is provided to the embedded software application developer on the power consumed by each of the high level functions present in the application.

Figure 1:
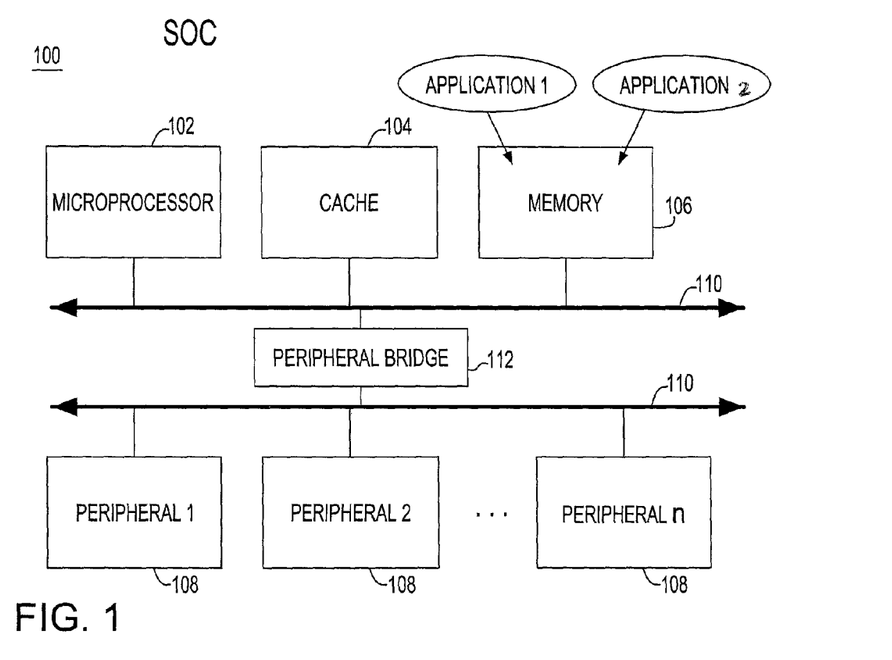
FIG. 1 is a schematic diagram of an exemplary System-on-Chip (SoC) 100, with which embodiments of the invention may be practiced.

Referring initially to FIG. 1, there is shown a schematic diagram of an exemplary System-on-Chip (SoC) 100, with which embodiments of the invention may be practiced. As shown, the SoC 100 includes one or more microprocessors (microprocessor 102), cache 104 and main memory 106. The main memory 106 may in turn have one or more executable applications (e.g., Application 1, Application 2) stored therein. In addition, the SoC 100 may further include one or more peripheral devices 108 (Peripheral 1, Peripheral 2, . . . , Peripheral n) in communication with the other SoC components through a bus structure 110, including peripheral bridge 112. Examples of peripheral devices 108 may include counter-timers, real-time timers and power-on reset generators, etc. In addition, other SoC components not specifically shown in FIG. 1 may include, for example, timing sources (such as oscillators and phase-locked loops), external interfaces (including industry standards such as USB, FireWire, Ethernet, USART, SPI), analog interfaces (including analog-to-digital converters (ADCs) and digital-to-analog converters (DACs)), voltage regulators and other power management circuits to name a few.

A scheme for power profiling of embedded applications running in multicore SoCs is presented herein. The profiling approach is implemented on a virtual hardware platform that includes high level models written in SystemC for the various components that constitute the hardware platform. The virtual platform is further augmented with instruction level power models for the processor and transaction level power models for the peripherals. After executing each instruction, a virtual platform simulator calls a built-in function that provides the simulation time, instruction and its address. This function, which is implemented as a callout function, is called by the virtual platform simulator, and is used for implementing the selective system level power profiling.

Figure 2:
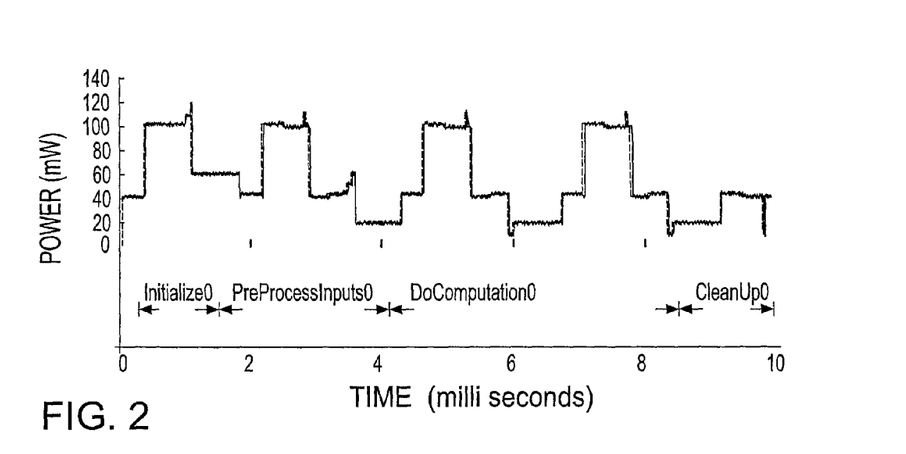
FIG. 2 illustrates a graphical example of an exemplary power profile for a given portion of an embedded application.

Essentially, an in-memory structure is generated by executing the object dump like program on the embedded application that is being profiled. During the execution of this application on the virtual platform, the in-memory structure is dynamically augmented to accumulate profile data. FIG. 2 illustrates a graphical example of what an exemplary power profile may look like for a given portion of an embedded application. The region of the embedded application to be profiled may be controlled by the user by inserting additional tokens into the application to identify regions of interest. The default (when no regions of interest are indicated by the user) is to profile the entire application.

Figure 3:
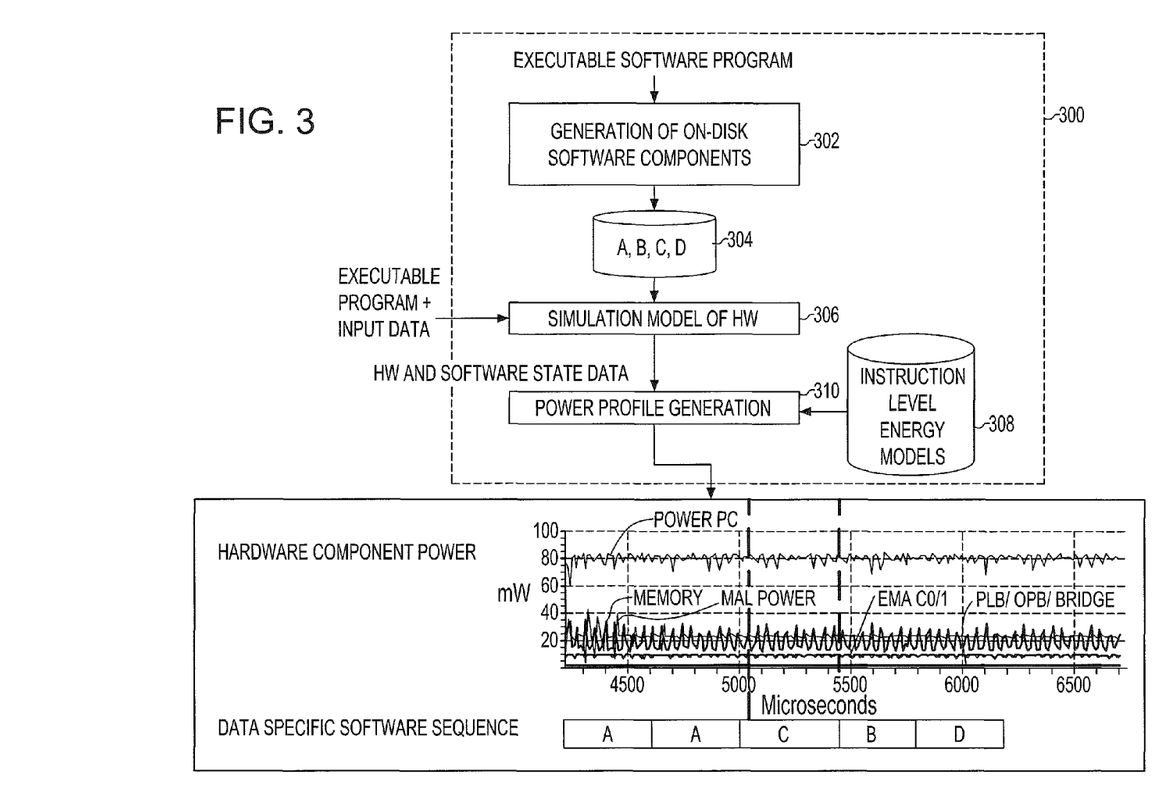
FIG. 3 is a high-level schematic block diagram of a method and system for implementing efficient and accurate gathering of system level power and performance statistics about an embedded application executing on a multi-core SoC, in accordance with an embodiment of the invention.

Referring now to FIG. 3, there is shown a high-level schematic block diagram of a method 300 for implementing efficient and accurate gathering of system level power and performance statistics about an embedded application executing on a multi-core SoC, in accordance with an embodiment of the invention. As reflected in blocks 302 and 304, an executable software program is broken down into one or more sub-components (e.g., A, B, C, D). Then, in block 306 the constituent sub-components of the executable software are loaded into a created simulation of actual SoC hardware (i.e., a virtual platform) that executes the software. During execution of the software on the virtual platform, state information about the hardware and software components is extracted. Then, using the hardware state information (e.g., from data tables 308), per-cycle energy values for all hardware sub-components and may be determined. In addition, using the software state information, a power profile is generated in block 310 by accumulating the per-cycle energy values and assigning them to software sub-components. Furthermore, at any point during the system simulation, queries may be made in order to examine the interaction between software sub-components and the hardware power contributors.

It is further contemplated that the temporal power profile may be represented as a parameterized power model for the software component, and stored in the form of one or more power model libraries for software components. Such a parameterized power model for commonly used software sub-components may be generated using the above method due to the ability to extract run-time parameters for branches, jumps and misses during the simulation of the software, and back annotating the parameters into the instruction level energy models, rolling them up to create such a software sub-component level parameterized power model. The parameters for power model may include, for example, branch and jump statistics, cache hit, miss and pipeline stall statistics (assuming there is a parameterized instruction level model). Moreover, the temporal profile generation can be accomplished without any instrumentation overhead.

Figure 4:
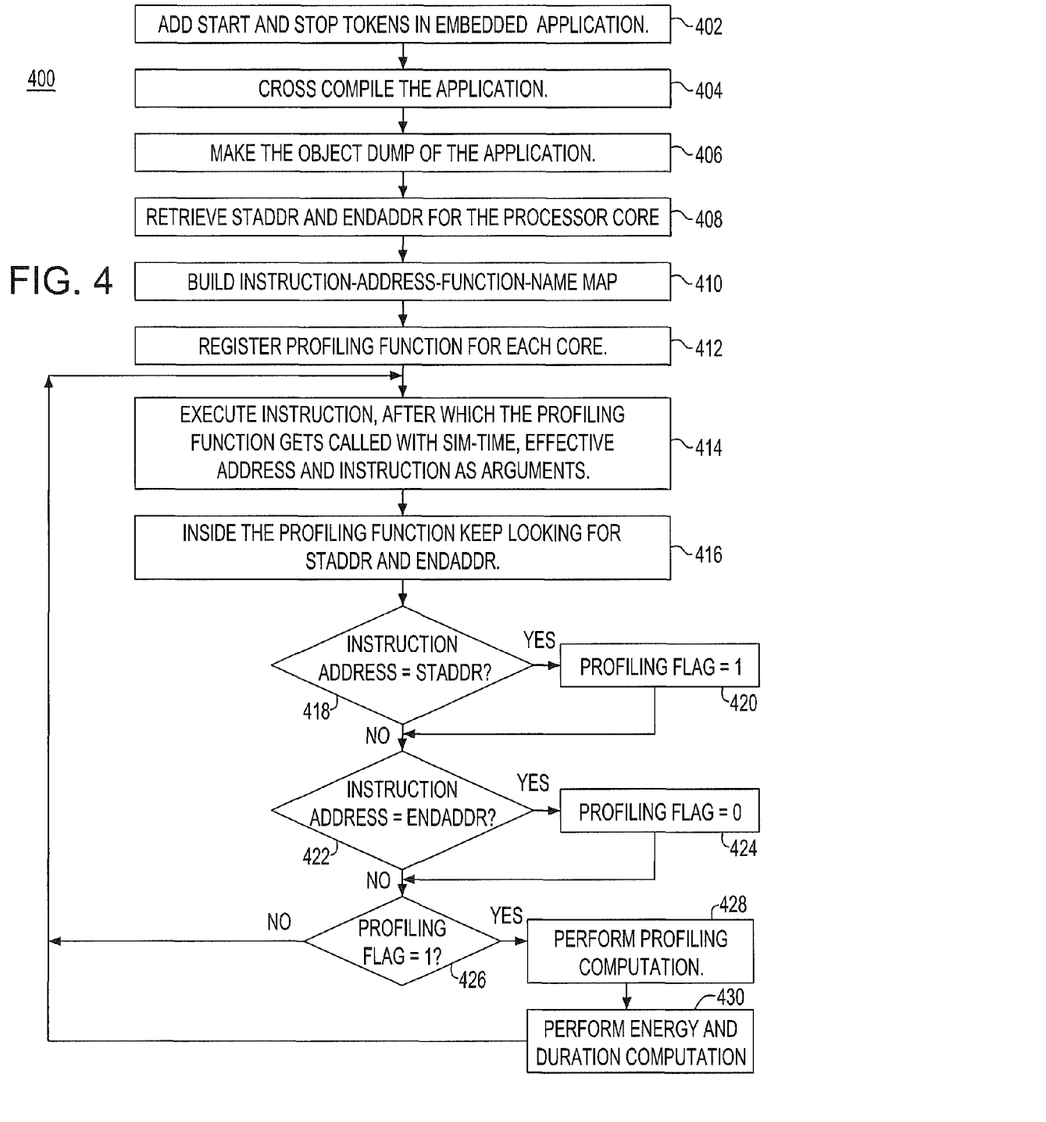
FIG. 4 is a more detailed flowchart illustrating exemplary operations involved in embodiments of the profiling technique illustrated in FIG. 3.

Referring now to FIG. 4, there is shown a flowchart 400 illustrating the operations involved in embodiments of the profiling technique mentioned above. As shown in block 402, start and stop tokens are added to the embedded application being profiled. In particular, a pair of void functions having an empty body are defined, void start_profile( ) { } and void stop_profile( ) { }. In the embedded application source, a call to start_profile( ) is inserted to mark the start of the profiling, and a call to stop_profile( ) to mark the end of selective profiling is made, as needed. This step is needed only if the user has regions of interest that need to be profiled, otherwise by default the entire program is profiled. In block 404, the embedded application is cross-compiled and in block 406, an object dump of the embedded application is made.

From the object dump, the exit address of the module start_profile( ) is recorded as STADDR and the entry address of stop_profile( ) is recorded as ENDADDR for the processor core, as shown in block 408. If no start_profile( ) or stop_profile( ) function calls are recorded in the program, then the STADDR is set to the beginning of the program and ENDADDR is set to the end of the program.

Then, as shown in block 410, an instruction-address function name map (which can be used to identify the module in which the instruction falls) is built, so that module level instrumentation can be enabled. A table of instructions may also be used to enable instruction level instrumentation. To this point, the above described operations are carried out for each of the processor cores on the SoC, and a separate profiling function is registered for each of the processor cores in block 412.

Proceeding to block 414, the embedded application is executed in the processor cores. The profiling functions, for each of the cores, gets called with simulation-time, effective address and instruction as arguments after the execution of each of the instructions. Inside the unique profiling function (when_what) provided for each of the cores, the STADDR is continuously looked for, and on receiving the address the profiling flag is switched on. In addition, the ENDADDR is continuously looked for to switch off the profiling flag, as further shown in block 416. More specifically, if at decision block 418 the instruction address corresponds to STADDR, then the profiling flag set to 1 as shown in block 420. If at decision block 422, the instruction address corresponds to ENDADDR, then the profiling flag is set to 0 as shown in block 424.

So long as the profiling flag is not set, as indicated in decision block 426, the process returns to block 414 to execute the current instruction. Conversely, while the profiling flag is set, profiling of various modules, instructions, etc. is performed as shown in block 428. Using the simulation time, instruction and its address, the time spent for executing the instruction, idling time, instruction count, accumulated energy etc., may be computed as shown in block 430 before returning back to block 414.

EXAMPLE

Presented below is an example of profiling an embedded application that performs matrix multiplication using a parallel algorithm. In particular, Table 2 illustrates sample application code being profiled.

TABLE 2

```
/******************************************************************
**********
    A program for matrix multiplication using a parallel algorithm. It uses
    assembler routines for flushing, invalidating and storing cache.
******************************************************************
*********/
#include <stdio.h>
#include <math.h>
#include <serial.h>
#define NPROC 2
#define MYID 0
typedef struct {
    unsigned char code;
    double val;
} MSG;
MSG *shmem=(MSG *)0x00a00000;
double *a = (double *)0x00b00000;
double *b = (double *)0x00c00000;
double *c = (double *)0x00d00000;
unsigned long loc,addr;
void start_profile(void) { };
void stop_profile(void) { };
double f(double);
double f(double a)
{
    return (4.0 / (1.0 + a*a));
}
int main(int argc,char *argv[ ])
{
    int n=16, myid=MYID, numprocs=NPROC, i,j,k;
    double h, sum, x;
    start_profile( );
    addr = (unsigned long)&loc;
    addr &=0x00f00000;
```

TABLE 2-continued

```
    addr >>= 20;
    myid = addr−1;
// Initializing shared memory by processor 0 for input matrices
    if(myid == 0) {
        for( j=0;j<n;j+−) {
            for(i=0;i<n;i−+) {
                loc = i*n+j;
                a[loc]=b[loc]=1.0;
            }
        }
// flushing cache; ie storing and invalidating
        if(numprocs > 1 ) { // in single processor case it is not
required
            for( j=0;j<n;j++) {
                for(i=0;i<n;i++) {
                    loc = i*n+j;
                    flushCache((unsigned long)&a[loc]);
                    flushCache((unsigned long)&b[loc]);
                }
            }
        }
        printf("Initializing Matrix A and Matrix B
. . . \n");
        for(i=1;i<numprocs;i++) shmem[i].code = 0;
// Setting flag to say that Initialisation is over
        shmem[0].code = 0xfe;
        storeCache((unsigned long)&(shmem[0].code));
    } // end of if(myid==0 )
// Other processors are waiting for initialization to be over
    else while( shmem[0].code != 0xfe)
invalidateCache((unsigned
long)&(shmem[0].code));
// Each processor is computing its share
    for (j = myid ; j < n; j += numprocs) {
        for(i=0;i<n; i+−) {
            sum=0;
            for(k=0;k<n;k−+) sum += (a[i*n+k]*b[k*n+j]);
            loc = i*n+j;
            c[loc] =sum;
        }
    }
// and flushing cache so that result is visible to others flushing is not
// included in previous loop since each flushing flushes a block of
// memory and hence this is more efficient; /
//flushing an already flushed block will be ignored
// Processors other than 0 is setting the flag to signal end of computation
    if(myid != 0) {
        shmem[myid].code = 0xfe;
        storeCache((unsigned long)&(shmem[myid].code));
    }
// Processor 0 is waiting for the results from others and once value is
// available summing the value
    else { // ie myid==0
        for (i=1;i<numprocs;i++) {
            while( shmem[i].code != 0xfe)
invalidateCache((unsigned
long)&(shmem[i].code));
        }
        for( j=0;j<n;j+−) {
            for(i=0;i<n;i−+) {
                loc = i*n+j;
                invalidateCache((unsigned long)&c[loc]);
            }
        }
    }
    stop_profile( );
// processor 0 is printing the value
    if (myid == 0) {
        for(i=0;i<n;i++) {
            for(j=0;j<n;j−+) printf("%lf ",c[i*n+j]);
            printf("\n");
        }
    }
if (myid == 0) {
printf("\nYou can now stop the simulation.\n");
}
    return 0;
}
```

As will be seen, the above code is well commented for an easy understanding of the algorithm used. In this example, the SoC is using multiple instances of PowerPC 440. Two matrices A and B are multiplied to get the resultant matrix C. For simplicity of implementation both A and B are square matrices with all elements set to 1. Thus, the resultant matrix will have all the elements as 16. The two empty functions start_profile( ) and stop_profile( ) are defined in the source file which needs to be profiled. It is possible to do profiling across multiple source files and, as mentioned earlier, also possible to have multiple instances of start_profile( ) and stop_profile( ). In the case of the application code shown above, it should be noted that the region of the code which prints out the value of the resultant matrix is not being profiled.

Continuing with the above example, Table 3 below represents a snapshot of the disassembled code—object dump:

TABLE 3

```
    ...
    ...
    100200:  7c 08 03 a6   mtlr    r0
    100204: 4e 80 00 20   blr
00100208 <start_profile>:
    100208: 94 21 ff e8   stwu    r1,-24(r1)
    10020c: 93 e1 00 14   stw     r31,20(r1)
    100210: 7c 3f 0b 78   mr      r31,r1
    100214: 81 61 00 00   lwz     r11,0(r1)
    100218: 83 eb ff fc   lwz     r31,-4(r11)
    10021c: 7d 61 5b 78   mr      r1,r11
    100220: 4e 80 00 20   blr
00100224 <stop_profile>:
    100224: 94 21 ff e8   stwu    r1,-24(r1)
    100228: 93 e1 00 14   stw     r31,20(r1)
    10022c: 7c 3f 0b 78   mr      r31,r1
    100230: 81 61 00 00   lwz     r11,0(r1)
    100234: 83 eb ff fc   lwz     r31,-4(r11)
    100238: 7d 61 5b 78   mr      r1,r11
    10023c: 4e 80 00 20   blr
00100240 <f>:
    100240: 94 21 ff e0   stwu    r1,-32(r1)
    100244: 7c 08 02 a6   mflr    r0
    100248: 93 e1 00 1c   stw     r31,28(r1)
    10024c: 90 01 00 24   stw     r0,36(r1)
    1002cc: 4e 80 00 20   blr
    ...
    ...
001002d0 <main>:
    1002d0: 94 21 ff 98   stwu    r1,-104(r1)
    1002d4: 7c 08 02 a6   mflr    r0
    1002d8: 93 e1 00 64   stw     r31,100(r1)
    1002dc: 90 01 00 6c   stw     r0,108(r1)
    1002e0: 7c 3f 0b 78   mr      r31,r1
    ...
    ...
```

Snapshot of the Profiling Results

Figure 5A:
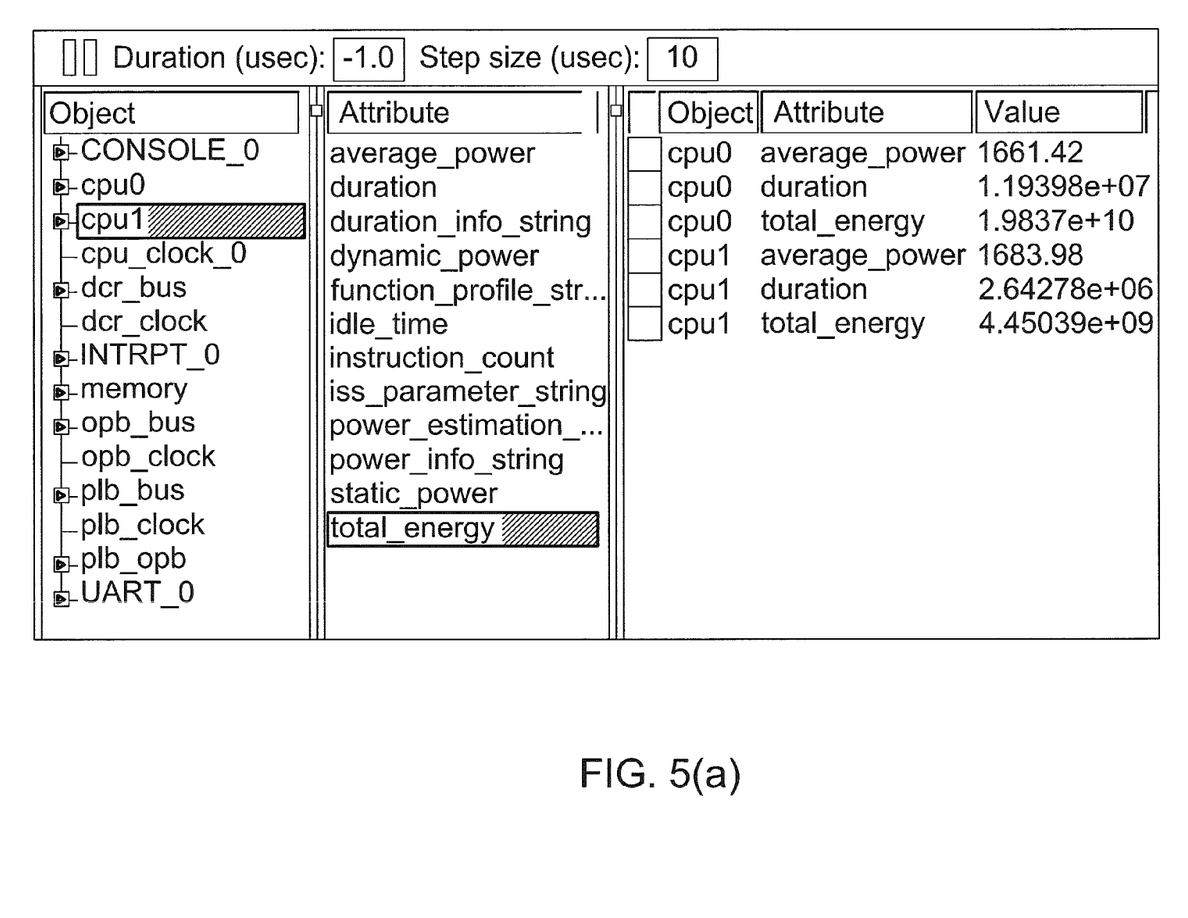
FIGS. 5 and 6 are exemplary snapshot results of system level power profiling using the methodology described in FIGS. 3 and 4.
Figure 5B:
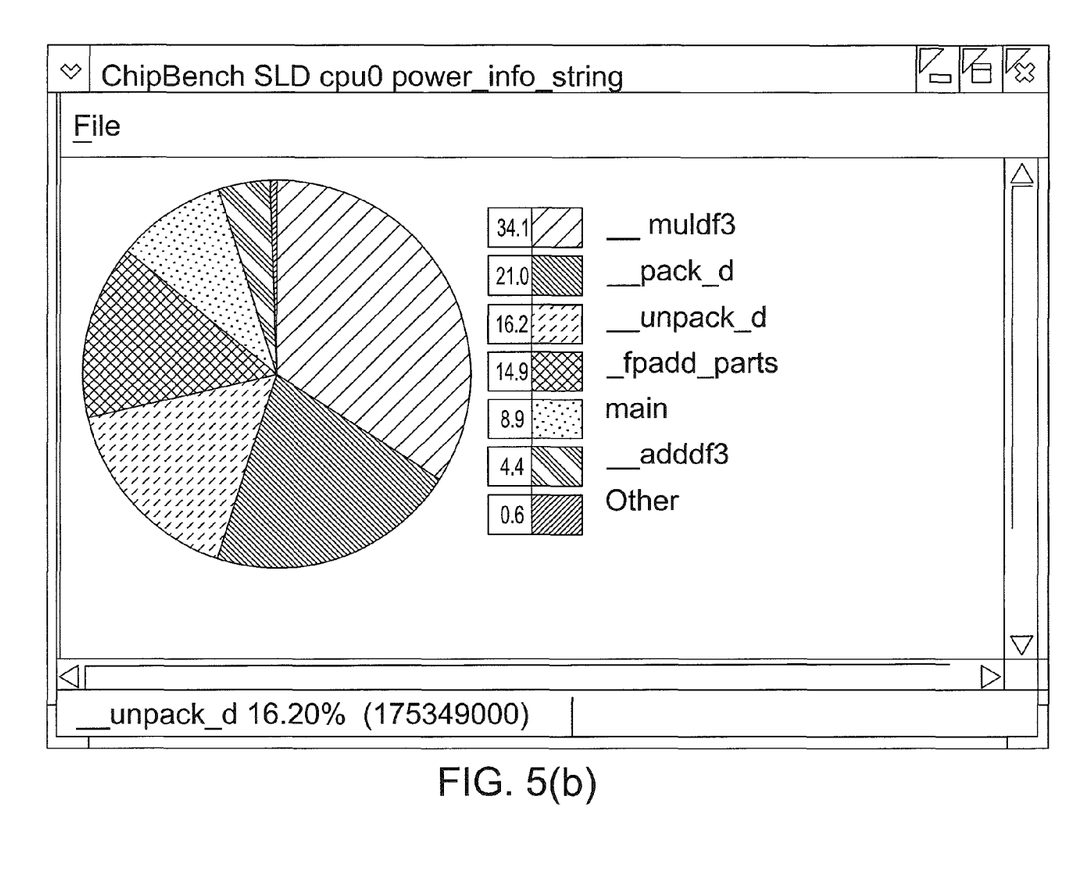
Figure 6A:
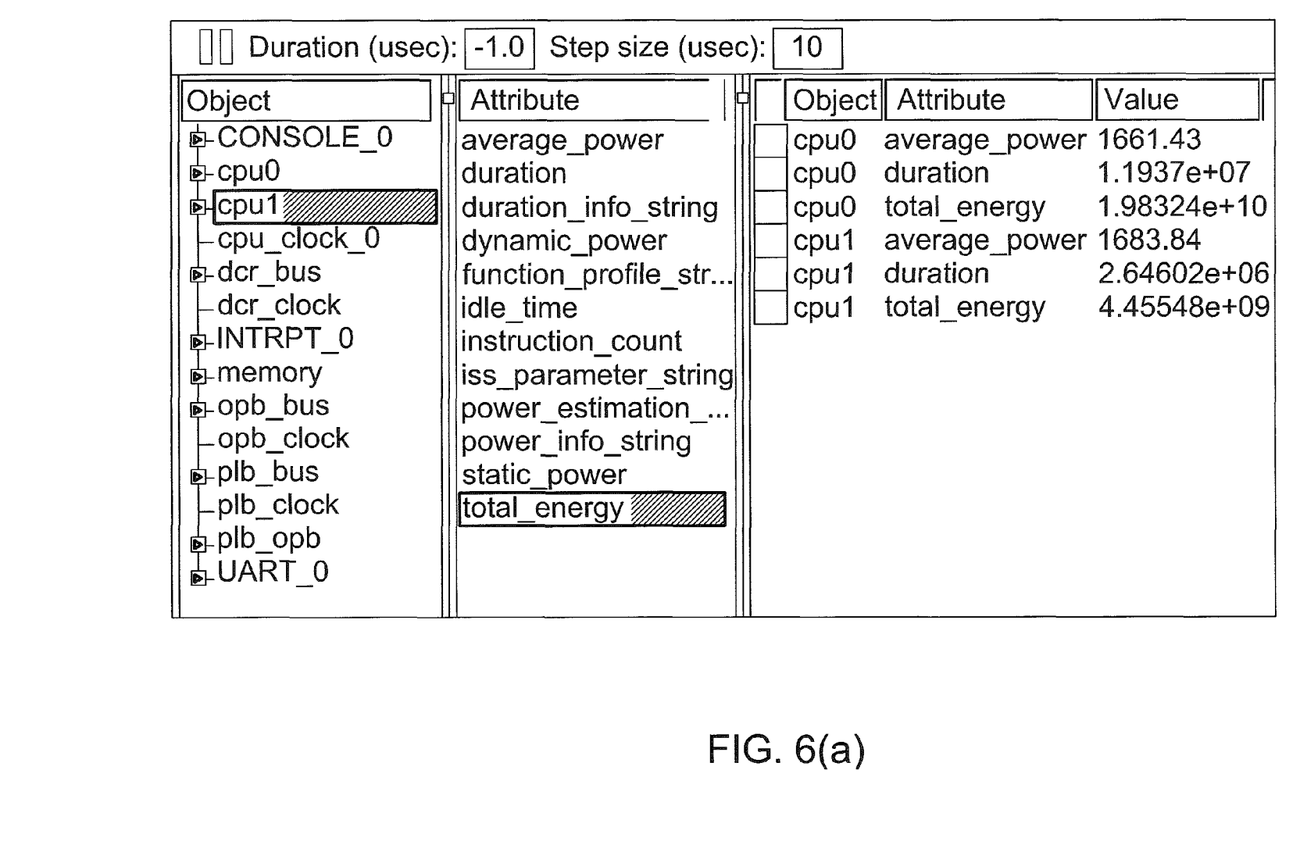
Figure 6B:
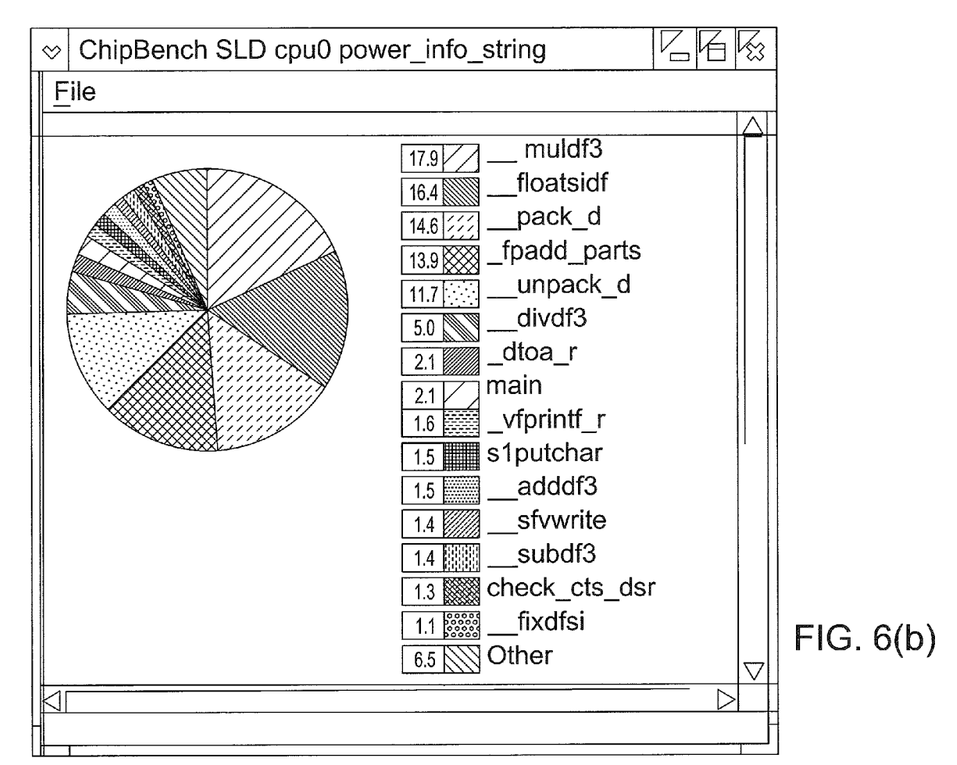

FIGS. 5-6 depict exemplary snapshot results of the system level power profiling using the above described methodology. The results are shown as two separate sets/scenarios. In Case 1 (FIG. 5) the profiling is switched off just after all of the parallel computation (i.e., just before processor 0 prints out the resultant matrix). In Case 2 (FIG. 6) profiling is on almost all the time, even when processor 0 prints out the resultant matrix. In part 'a' of each case (i.e., FIGS. 5(*a*), 6(*a*), respectively), the duration, average power and total energy of each processor core is shown. In part 'b' of each case (i.e., FIGS. 5(*b*), 6(*b*), respectively), a pie-chart depicting the 'power info string' of each processor core is shown. The 'power info string' attribute of the processor core is significant from a system level power profiling perspective.

As will thus be appreciated, the system level power profiling described above is implemented without the need for any instrumentation. The scheme provides total control over the region of interest with minimal overhead, and completely avoids the need for compiler assisted instrumentation. In contrast, code generated by a compiler with the instrumentation probes may be substantially less efficient than without the instrumentation and will generate many spurious bus transactions, which makes the accurate and reliable computation of system level power estimation and profiling difficult.

Further, the present scheme provides a way for the profiling of the execution thread as selected in the source code of the application, with a negligible error due to the presence of start_profile( ) and the entry of stop_profile( ), and the scheme works without any difficulty in multi-core environment as well. By executing multiple threads for each of the cores and independently profiling threads as specified using start and stop addresses, multi-core profiling can be obtained.

The embodiments disclosed herein do not require any special tools other than a program for the object dump of the executable, and do not need any OS or compiler support, which is required for most existing profilers. This makes the mechanism ideal for lightweight, embedded applications. The present methodology may be implemented on a "per need" basis, as opposed to typical profiling approaches which work on entire applications and not specific regions of interest within an application. Moreover, the scheme suggests a mechanism to select a region for profiling crossing boundaries of modules or with in a module. This helps in achieving a drastic reduction in the processor overhead, thus making the scheme ideal for embedded systems where performance and power consumption are absolutely crucial.

Figure 7:
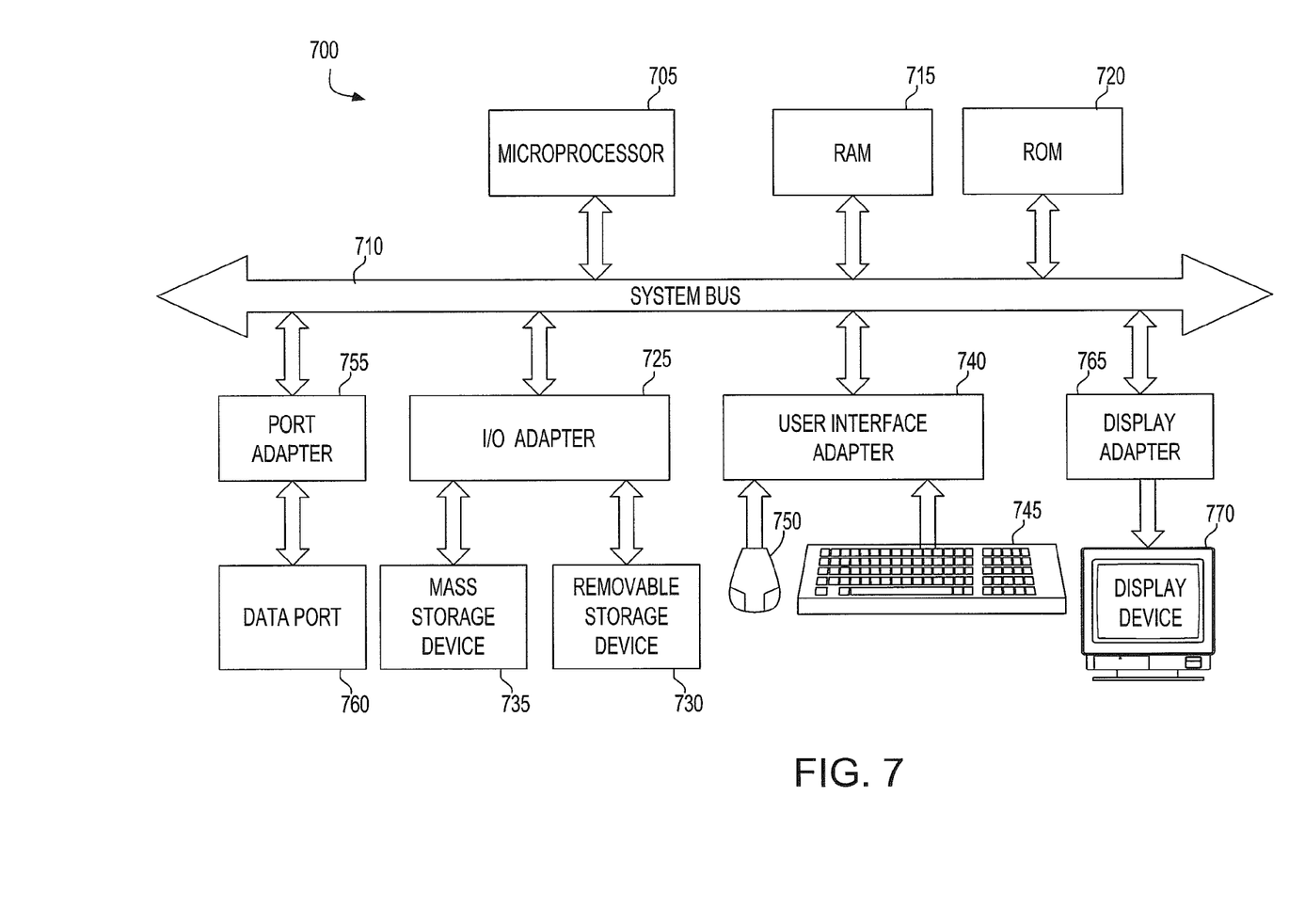
FIG. 7 is a schematic block diagram of a general-purpose computing system suitable for practicing embodiments of the present invention.

Generally, the method embodiments for system level power profiling of embedded applications executing on virtual multi-core (SoC) platforms may be practiced with a general-purpose computer and the method may be coded as a set of instructions on removable or hard media for use by the general-purpose computer. FIG. 7 is a schematic block diagram of a general-purpose computing system suitable for practicing embodiments of the present invention. In FIG. 7, computing system 700 has at least one microprocessor or central processing unit (CPU) 705. CPU 705 is interconnected via a system bus 710 to a random access memory (RAM) 715, a read-only memory (ROM) 720, an input/output (I/O) adapter 725 for a connecting a removable data and/or program storage device 730 and a mass data and/or program storage device 735, a user interface adapter 740 for connecting a keyboard 745 and a mouse 750, a port adapter 755 for connecting a data port 760 and a display adapter 765 for connecting a display device 770.

ROM 720 contains the basic operating system for computing system 700. The operating system may alternatively reside in RAM 715 or elsewhere as is known in the art. Examples of removable data and/or program storage device 730 include magnetic media such as floppy drives and tape drives and optical media such as CD ROM drives. Examples of mass data and/or program storage device 735 include hard disk drives and non-volatile memory such as flash memory. In addition to keyboard 745 and mouse 750, other user input devices such as trackballs, writing tablets, pressure pads, microphones, light pens and position-sensing screen displays may be connected to user interface 740. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 730, fed through data port 760 or typed in using keyboard 745.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 3 and 4.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of generating system level power information for an embedded application configured to execute on a multi-core system-on-chip (SoC), the method comprising:
   configuring a simulation model of hardware sub-components of the SoC that executes the embedded application;
   breaking down the embedded application into software sub-components;
   loading the software sub-components of the embedded application into the simulation model;
   executing the software sub-components of the embedded application on the simulation model, and extracting state information about the software sub-components of the embedded application and state information about hardware sub-components of the SoC, the hardware sub-components including individual processor cores, one or more buses, one or more memories, and one or more peripheral devices;
   determining, from the hardware state information, per-cycle energy values for multiple of the hardware sub-components of the SoC; and
   creating, a power profile for each of the hardware components, including each individual processor core of the multi-core SoC, and assigning the per-cycle energy values of the hardware subcomponents to corresponding software sub-components.

2. The method of claim 1, wherein creating the power profile further comprises:
   adding one or more start profile tokens and one or more stop profile tokens to the embedded application;
   cross compiling and making an object dump of the embedded application;
   recording an exit address of the one or more start profile tokens and recording an entry address of the one or more start profile tokens, for each core of the multi-core SoC;
   building an instruction-address function name map to identify a module in which a given instruction falls;
   registering a separate profiling function for each of the cores;
   executing the embedded application in each of the cores, calling the registered profiling function associated with each core; and
   performing one or more computations associated with the called profiling function, so long as a profiling flag is set.

3. The method of claim 2, wherein the profiling functions are represented as parameterized power models that are sensitive to changes in a given set of input parameters.

4. The method of claim 2, wherein the registered profiling function associated with each core is called with simulation-time, effective address and instruction as arguments after execution of each of the instructions of the embedded application.

5. The method of claim 2, wherein setting of the profiling flag depends on the outcome of a comparison between a current instruction address with the one or more start profile tokens and the one or more stop profile tokens.

6. The method of claim 5, wherein the profiling flag is set to 1 whenever the current instruction address is equal to the exit address of one of the start profile tokens, and the profiling flag is set to 0 whenever the current instruction address is equal to the start address of one of the stop profile tokens.

7. The method of claim 1, further comprising querying, during executing the software sub-components of the embedded application on the simulation model, an interaction between the software sub-components of the embedded application and associated power contributing hardware sub-components of the SoC.

8. The method of claim 1, wherein the power profile includes a duration, an average power and a total energy of each individual processor core of the multi-core SoC.

9. A computer program product, comprising: a non-transitory computer-readable storage medium containing computer program code stored thereon that, when executed by a computer, implements a method of generating system level power information for an embedded application configured to execute on a multi-core system-on-chip (SoC) that includes hardware sub-components, the method comprising:
   breaking down the embedded application into software sub-components;
   loading the software sub-components of the embedded application into t-he a simulation model-of the SoC that includes the hardware sub-components;
   executing the software sub-components of the embedded application on the simulation model;
   extracting, during the execution, state information about both the software sub-components of the embedded application and about the hardware sub-components of the SoC, the hardware state information including state information for individual processor cores, one or more buses, one or more memories, and one or more peripheral devices;

determining, from the hardware state information, per-cycle energy values for the hardware sub-components of the SoC; and creating, a power profile for each of the hardware components, including each individual processor core of the multi-core SoC, and assigning the per-cycle energy values of the hardware subcomponents to corresponding software sub-components.

10. The computer program product of claim 9, wherein creating the power profile further comprises:

adding one or more start profile tokens and one or more stop profile tokens to the embedded application;

cross compiling and making an object dump of the embedded application;

recording an exit address of the one or more start profile tokens and recording an entry address of the one or more start profile tokens, for each core of the multi-core SoC;

building an instruction-address function name map to identify a module in which a given instruction falls;

registering a separate profiling function for each of the cores;

executing the embedded application in each of the cores, calling the registered profiling function associated with each core; and performing one or more computations associated with the called profiling function, so long as a profiling flag is set.

11. The computer program product of claim 10, wherein the profiling functions are represented as parameterized power models that are sensitive to changes in a given set of input parameters.

12. The computer program product of claim 10, wherein the registered profiling function associated with each core is called with simulation-time, effective address and instruction as arguments after execution of each of the instructions of the embedded application.

13. The computer program product of claim 10, wherein setting of the profiling flag depends on the outcome of a comparison between a current instruction address with the one or more start profile tokens and the one or more stop profile tokens.

14. The computer program product of claim 13, wherein the profiling flag is set to 1 whenever the current instruction address is equal to the exit address of one of the start profile tokens, and the profiling flag is set to 0 whenever the current instruction address is equal to the start address of one of the stop profile tokens.

15. The computer program product of claim 9, wherein the method further comprises querying, during executing the software sub-components of the embedded application on the simulation model, an interaction between the software sub-components of the embedded application and associated power contributing hardware sub-components of the SoC.

16. The computer program product of claim 9, wherein the power profile includes a duration, an average power and a total energy of each individual processor core of the multi-core SoC.

17. A system for generating system level power information for an embedded application configured to execute on a multi-core system-on-chip (SoC), comprising:

a computing network including a processing device in communication with one or more computer memory storage devices; and the computing network further configured to implement a method, the method further comprising:

loading the software sub-components of the embedded application into a simulation model of the SoC hardware;

breaking down the embedded application into software sub-components; executing the software sub-components of the embedded application on the simulation model, and extracting state information about both the software sub-components of the embedded application and hardware components and hardware sub-components of the SoC, the hardware sub-components including individual processor cores, one or more buses, one or more memories, and one or more peripheral devices;

determining, from the hardware state information, per-cycle energy values for the hardware sub-components of the SoC; and creating, a power profile for each of the hardware components, including each individual processor core of the multi-core SoC, and assigning the per-cycle energy values of the hardware subcomponents to corresponding software sub-components.

18. The system of claim 17, wherein creating the power profile further comprises:

adding one or more start profile tokens and one or more stop profile tokens to the embedded application;

cross compiling and making an object dump of the embedded application;

recording an exit address of the one or more start profile tokens and recording an entry address of the one or more start profile tokens, for each core of the multi-core SoC;

building an instruction-address function name map to identify a module in which a given instruction falls;

registering a separate profiling function for each of the cores;

executing the embedded application in each of the cores, calling the registered profiling function associated with each core; and performing one or more computations associated with the called profiling function, so long as a profiling flag is set.

19. The system of claim 18, wherein the profiling functions are represented as parameterized power models that are sensitive to changes in a given set of input parameters.

20. The system of claim 18, wherein the registered profiling function associated with each core is called with simulation-time, effective address and instruction as arguments after execution of each of the instructions of the embedded application.

21. The system of claim 18, wherein setting of the profiling flag depends on the outcome of a comparison between a current instruction address with the one or more start profile tokens and the one or more stop profile tokens.

22. The system of claim 21, wherein the profiling flag is set to 1 whenever the current instruction address is equal to the exit address of one of the start profile tokens, and the profiling flag is set to 0 whenever the current instruction address is equal to the start address of one of the stop profile tokens.

23. The system of claim 17, wherein the method further comprises querying, during executing the software sub-components of the embedded application on the simulation model, an interaction between the software sub-components of the embedded application and associated power contributing hardware sub-components of the SoC.

24. The system of claim 17, wherein the power profile includes a duration, an average power and a total energy of each individual processor core of the multi-core SoC.

* * * * *